US011530981B2

United States Patent
Kim et al.

(10) Patent No.: US 11,530,981 B2
(45) Date of Patent: Dec. 20, 2022

(54) SYSTEM FOR ANALYZING DISPLAY DEVICE AND COLOR ANALYZING METHOD THEREOF

(71) Applicant: VIEWORKS CO., LTD., Anyang-si (KR)

(72) Inventors: Seung Hyun Kim, Seongnam-si (KR); Gi Ryong Choi, Gunpo-si (KR); Jin Hee Oh, Seoul (KR); Yoon Hyuk Lee, Uiwang-si (KR)

(73) Assignee: VIEWORKS CO., LTD., Anyang-si (KR)

( * ) Notice: Subject to any disclaimer, the term of this patent is extended or adjusted under 35 U.S.C. 154(b) by 0 days.

(21) Appl. No.: 17/225,544

(22) Filed: Apr. 8, 2021

(65) Prior Publication Data
US 2021/0318232 A1 Oct. 14, 2021

(30) Foreign Application Priority Data

Apr. 10, 2020 (KR) .......... 10-2020-0044219

(51) Int. Cl.
| | | |
|---|---|---|
| *G01N 21/27* | (2006.01) | |
| *G01N 21/88* | (2006.01) | |
| *G09G 3/20* | (2006.01) | |
| *G09G 3/3225* | (2016.01) | |

(52) U.S. Cl.
CPC ....... *G01N 21/274* (2013.01); *G01N 21/8851* (2013.01); *G09G 3/2003* (2013.01); *G01N 2021/8887* (2013.01); *G09G 3/3225* (2013.01); *G09G 2320/0693* (2013.01)

(58) Field of Classification Search
CPC .... G01J 2003/2813; G01J 3/506; G01J 3/524; G01N 2021/8887; G01N 21/274; G01N 21/8851; G09G 2320/0693; G09G 3/2003; G09G 3/3225; G09G 2320/0257; G09G 2360/145; G09G 2360/16; G09G 3/006; G09G 3/36; G06K 9/00
See application file for complete search history.

(56) References Cited

U.S. PATENT DOCUMENTS

| | | | |
|---|---|---|---|
| 2006/0188150 A1* | 8/2006 | Katsumata | G01J 3/02 |
| | | | 382/162 |
| 2007/0088535 A1* | 4/2007 | Ten | G09G 5/026 |
| | | | 703/21 |
| 2012/0026315 A1* | 2/2012 | Lee | G09G 3/006 |
| | | | 348/125 |

(Continued)

FOREIGN PATENT DOCUMENTS

| | | |
|---|---|---|
| JP | H102800 A | 1/1998 |
| JP | H1194735 A | 4/1999 |

(Continued)

*Primary Examiner* — Kenneth Bukowski
(74) *Attorney, Agent, or Firm* — Rabin & Berdo, P.C.

(57) ABSTRACT

Disclosed is a system for analyzing a display device, the system including: an image photographing device configured to photograph an image for inspection output from a display device to be inspected and obtain an RGB value for inspection from the photographed image; and an inspection control unit configured to convert the RGB value for inspection into a CIE XYZ value by using a previously prepared color conversion function, and determine defect of the display device to be inspected by using the converted CIE XYZ value.

15 Claims, 11 Drawing Sheets

(56) References Cited

U.S. PATENT DOCUMENTS

| | | | |
|---|---|---|---|
| 2016/0231175 A1 | 8/2016 | Sasada et al. | |
| 2016/0234490 A1 | 8/2016 | Sasada et al. | |
| 2020/0043201 A1* | 2/2020 | Tanaka | H04N 9/69 |
| 2021/0049787 A1* | 2/2021 | Lucas | G06T 7/90 |

FOREIGN PATENT DOCUMENTS

| | | | |
|---|---|---|---|
| JP | H11313346 A | | 11/1999 |
| JP | 2002247394 A | | 8/2002 |
| JP | 2005011266 A | | 1/2005 |
| JP | 2012163486 A | | 8/2012 |
| JP | 2016145829 A | | 8/2016 |
| KR | 1020040021401 A | | 3/2004 |
| KR | 101362329 B1 | | 2/2014 |
| KR | 1020140054719 A | | 5/2014 |
| KR | 20180061792 | * | 6/2018 |
| KR | 1020180061792 A | | 6/2018 |
| KR | 101975314 B1 | | 5/2019 |

* cited by examiner

SYSTEM FOR ANALYZING DISPLAY DEVICE AND COLOR ANALYZING METHOD THEREOF

CROSS-REFERENCE TO RELATED APPLICATIONS

This application claims priority to and the benefit of Korean Patent Application No. 10-2020-0044219 filed in the Korean Intellectual Property Office on Apr. 10, 2020, the entire contents of which are incorporated herein by reference.

TECHNICAL FIELD

The present invention relates to a system for analyzing a display device, and a color analysis method thereof, and for example, to a system for analyzing a display device by using an image photographing device, and a color analysis method thereof.

BACKGROUND ART

A display device is a device which is applied to a TV, a monitor, a smart phone, and the like, to output an image that can be viewed through the eyes of a user. A display device may be divided into a light emitting type that emits light by itself, and a light-receiving type that operates with external light.

The light emitting type display device includes a Cathode-Ray Tube (CRT), a Plasma Display Panel (PDP), an Organic Light Emitting Diode (OLED), an Active Matrix Organic Light Emitting Diode (AMOLED), a Quantum dot Light emitting Diode (QLED), and the like. The light-receiving type display device includes a typical Liquid Crystal Display (LCD).

Among the display devices, the OLED display panel has advantages of a wide viewing angle, excellent contrast, and a high response speed, so that recently, the OLED display panel has been widely used in portable display devices, smart phones, tablet PCs, and the like, and is attracting attention as a next-generation display device through enlargement.

In particular, the OLED display panel has an advantage in that characteristics, such as luminance, driving voltage, and response speed, are excellent, and multicolorization is possible, compared to an inorganic light emitting display device.

In the case of the OLED display device, a substrate, in which a Thin Film Transistor (TFT) layer is formed through various thin film forming processes, an etching process, and the like under a manufacturing process is provided. An organic light emitting layer formed of a lower electrode, an organic film layer (for example, a hole transport layer, a light emitting layer, and an electron transport layer), and an upper electrode is formed on the TFT layer, and then a substrate formed with the TFT layer and the organic light emitting layer is encapsulated by using an encapsulating substrate to complete an OLED display device.

In the meantime, for the various finally completed display devices including the OLEDS, an inspection process may be performed on cells formed on the substrate, and the inspection process for checking whether the product is good or not includes a function inspection for the TFT layer to which an inspection signal is applied, a correction circuit inspection, an image quality inspection, a spectral inspection, an image inspection, a surface foreign substance inspection, and the like, and various equipment for processing the respective examination processes has been developed.

In the case of the image quality inspection and the image inspection among the existing examination processes, a conversion table is created through a relationship between a first RGB value that is transmitted to a reference display device by a color signal generator, a CIE XYZ value that is measured by photographing the color palette output from the reference display device with a spectrometer, and a second RGB value measured by photographing the color palette of the reference display device with a camera device. Herein, the CIE XYZ value is the representative example of the color space standard defined by the International Commission on Illumination.

Thereafter, an object to be inspected (display device) is photographed by using photographing equipment, and the RGB value measured from the display device by using the pre-created conversion table is converted into a CIE XYZ value.

However, since the RGB value is a digital value obtained by integrating the wavelength of light entering the photographing device according to the sensitivity of the photographing device, it is difficult to convert the RGB value into the CIE XYZ value that is the standard color coordinate without a limitation condition.

In particular, the wavelength of light of the light-receiving type display device which reflects light emitted from a general light source (lighting) is considerably different from the wavelength of light output from the light emitting type display device, so that it is difficult to use the two wavelengths as references.

In order to solve the problem, it is required to limit the display device for calibration (reference) and the display device to be inspected to the same type and perform accurate calibration.

SUMMARY OF THE INVENTION

The present invention has been made in an effort to provide a system for analyzing a display device, which performs entire image photographing, color measurement, and color analysis on a light emitting display device (an Organic Light Emitting Diode (OLED), a Quantum dot Light Emitting Diode (QLED), an Active Matrix Organic Light Emitting Diode (AMOLED), and the like) at the same time, so that it is possible to rapidly measure colors and inspection efficiency is improved, and a color analysis method thereof.

An exemplary embodiment of the present invention provides a system for analyzing a display device, the system including: an image photographing device configured to photograph an image for inspection output from a display device to be inspected and obtain an RGB value for inspection from the photographed image; and an inspection control unit configured to convert the RGB value for inspection into a CIE XYZ value for inspection by using a previously prepared color conversion function, and determine defect of the display device to be inspected by using the converted CIE XYZ value for inspection.

The display device to be inspected may be a light emitting display device.

The inspection control unit may compare the CIE XYZ value for inspection with a reference CIE XYZ value and determine defect of the display device to be inspected according to correspondence between the CIE XYZ value for inspection and the reference CIE XYZ value.

The inspection control unit may include: an inspection image output unit which controls an output of the display device to be inspected; a communication processing unit which performs communication with the image photographing device and receives the RGB value for inspection; and a color converting unit which converts the RGB value for inspection into the CIE XYZ value for inspection by using the color conversion function.

The system may further include a color analyzing device configured to photograph an image for calibration of a display device for calibration and measure a spectrum of the photographed image.

The display device for calibration may be a light emitting display device that is the same type as the type of the display device to be inspected.

The color analyzing device may obtain a light wavelength from the spectrum and convert the obtained light wavelength into a CIE XYZ value for calibration.

The image photographing device may photograph the image for calibration output from the display device for calibration and obtain an RGB value for calibration from the photographed image.

The system may further include a calibration control unit configured to calculate a color conversion function by using the RGB value for calibration and the CIE XYZ value for calibration obtained by the color analyzing device.

The calibration control unit may include: a calibration image output unit which controls an output of the display device for calibration; a communication processing unit which performs communication with the color analyzing device or the image photographing device and receives the CIE XYZ value for calibration and the RGB value for calibration; and a color calculating unit which generates the color conversion function by using the CIE XYZ value for calibration and the RGB value for calibration.

The system may further include a jig device including a mounting unit to which the display device for calibration is mounted, and a holding unit which is provided at a location facing the mounting unit and in which the color analyzing device and the image photographing device are held.

The jig device may be configured to connect the mounting unit and the holding unit, and have a sliding structure that allows back and forth and left and right sliding operations.

The system may further include a calibration control unit configured to photograph a center portion and an outer portion of the display device for calibration by adjusting a location of the image photographing device by controlling the sliding structure.

Another exemplary embodiment of the present invention provides a method of analyzing a color of a system for analyzing a display device, the method including: an RGB image for inspection photographing operation for photographing an image for inspection and obtaining an RGB value for inspection from the photographed image; and a defect inspecting operation for determining a defect of the image for inspection by using a previously prepared color conversion function and the RGB value for inspection.

The method may further include: an RGB image for calibration photographing operation for photographing the image for calibration and obtaining an RGB value for calibration from the photographed image; a standard color photographing operation for photographing the image for calibration and obtaining a CIE XYZ value for calibration from the photographed image; and a color conversion function calculating operation for calculating a color conversion function by using the RGB value for calibration and the CIE XYZ value for calibration.

The method may further include: a color conversion function storing operation for storing the color conversion function.

The method may further include a CIE XYZ value for inspection calculating operation for calculating a CIE XYZ value for inspection by using the color conversion function and the RGB value for inspection.

The defect inspecting operation may include comparing the CIE XYZ value for inspection with a reference CIE XYZ value and determining defect of the image to be inspected according to correspondence between the CIE XYZ value for inspection and the reference CIE XYZ value.

In the RGB image for calibration photographing operation and the standard color photographing operation, a center portion and an outer portion of the image for calibration may be photographed by using a jig device.

The image for calibration and the image for inspection may be output from a light emitting display device.

According to the system for analyzing the display device and the color analysis method thereof according to the exemplary embodiment of the present invention, it is possible to rapidly measure colors and improve inspection efficiency by simultaneously performing entire image photographing, color measurement, and color analysis on a display device, such as a light emitting display device (OLED, QLED, AMOLED, and the like).

It is also possible to inspect a display device by using a general image photographing device, thereby achieving simple and inexpensive inspection of the display device.

A conversion equation is created by using two types of data, a CIE XYZ value and an RGB value, obtained by photographing an image with an image photographing device, thereby improving conversion efficiency compared to the related art.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
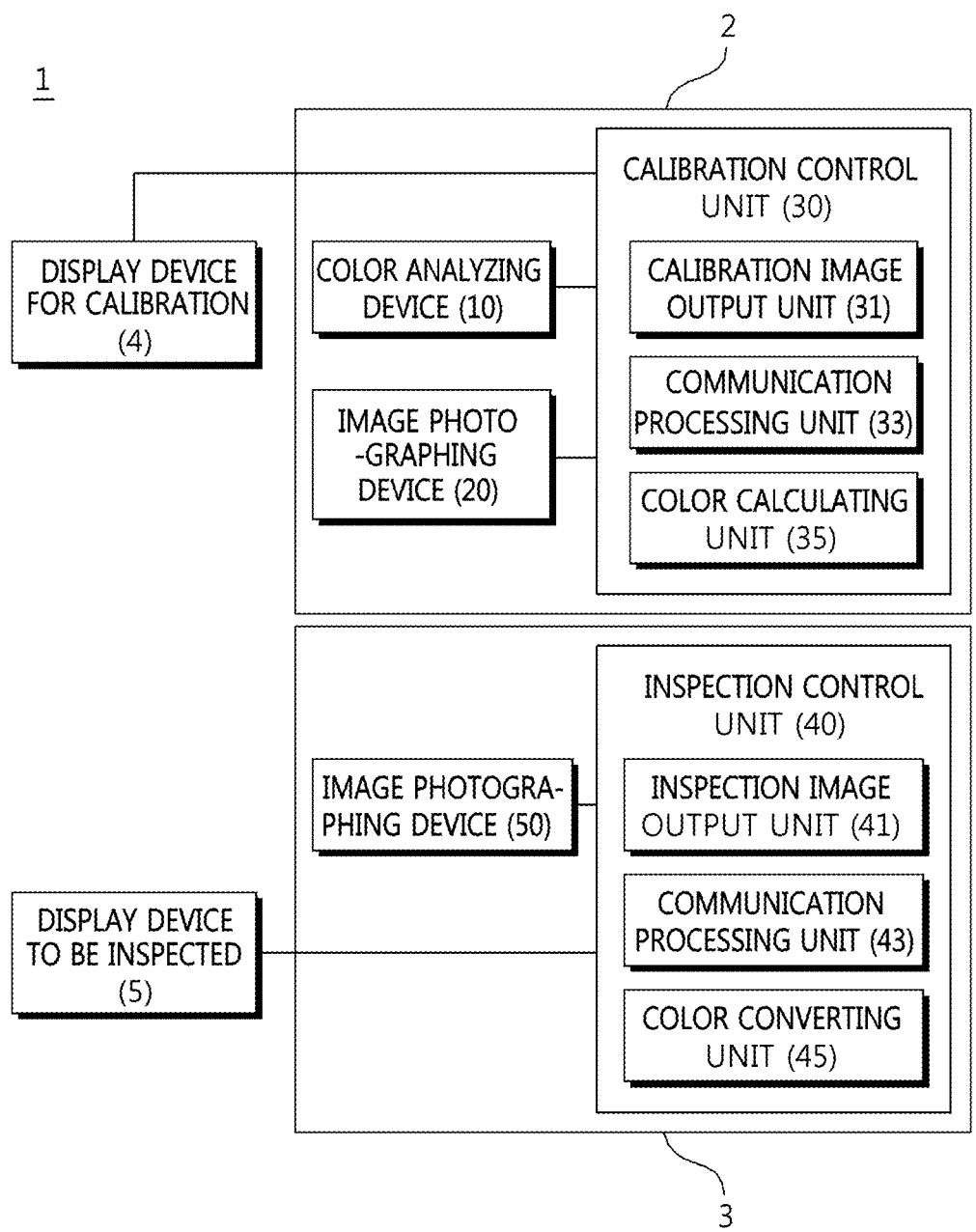
FIG. 1 is a block diagram illustrating a system for analyzing a display device according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, it should be noted that in giving reference numerals to elements of each drawing, like reference numerals refer to like elements even though like elements are shown in different drawings. It should be understood that although the exemplary embodiment of the present invention is described hereafter, the spirit of the present invention is not limited thereto and the present invention may be changed and modified in various ways by those skilled in the art.

FIG. 1 is a block diagram illustrating a system for analyzing a display device according to an exemplary embodiment of the present invention.

A system 1 for analyzing a display device according to an exemplary embodiment of the present invention is for inspecting defect through a color analysis of a display device.

Referring to FIG. 1, the system 1 for analyzing the display device according to the present invention includes a calibrating device 2 and an inspection device 3.

The calibrating device 2 is the device for preparing a conversion reference value (for example, a color conversion function) used for inspecting a display device 5 to be inspected by using a calibrating display device 4.

The inspection device 3 is the device for inspecting defect of the display device 5 to be inspected in consideration of the conversion reference value prepared by the calibrating device 2. Hereinafter, the calibrating device 2 will be described first, and then the inspection device 3 will be described.

The calibrating device 2 may include a color analyzing device 10, an image photographing device 20, and a calibration control unit 30.

The color analyzing device 10 is the device for photographing the image for calibration displayed in the display device 4 for calibration and measuring a spectrum of the photographed image. Herein, the display device 4 for calibration may be a light emitting display device, such as an Organic Light Emitting Diode (OLED), a Quantum dot Light Emitting Diode (QLED), and an Active Matrix Organic Light Emitting Diode (AMOLED). The display device 4 for calibration may be controlled by the calibration control unit 30 to output the image for calibration expressing a single color or various colors.

The color analyzing device 10 may acquire at least one of three light wavelengths L1, L2, and L3 included in the spectrum of the photographed image. Herein, L1, L2, and L3 may represent unprescribed color coordinate values. In the exemplary embodiment, the color analyzing device 10 may include a spectrometer, a tristimulus colorimeter, and an RGB colorimeter including a spectrometer. The color analyzing device 10 may have a color matching function that converts a unprescribed color coordinate value to a CIE XYZ value. The color analyzing device 10 may convert each light wavelength of L1, L2, and L3 into a CIE XYZ value by using the color matching function. The color analyzing device 10 may transfer the converted CIE XYZ value to the calibration control unit 30. In the exemplary embodiment, the CIE XYZ value obtained by the color analyzing device 10 may be defined as a CIE XYZ value for calibration.

The image photographing device 20 is the device for photographing the image for calibration displayed in the display device 4 for calibration and obtaining an RGB value from the photographed image. In the exemplary embodiment, the image photographing device 20 may be an RGB camera using a Complementary Metal-Oxide Semiconductor (CMOS) sensor. Herein, the RGB value obtained in the image for calibration may be defined as an RGB value for calibration. The calibration control unit 30 is the device for controlling the output of the image of the display device 4 for calibration, and may include a calibration image output unit 31, a communication processing unit 33, and a color calculation unit 35.

The calibration image output unit 31 may control the output of the display device 4 for calibration by transmitting a signal related to the image for calibration to the display device 4 for calibration. The calibration image output unit 31 may generate the image for calibration through an external input or autonomously. The calibration image output unit 31 may generate an image of a single color or an image with a combination of various colors.

The communication processing unit 33 is the device for performing the communication with the color analyzing device 10 or the image photographing device 20. The communication processing unit 33 may receive the CIE XYZ value for the image for calibration through the communication with the color analyzing device 10. The communication processing unit 33 may receive the RGB value for the image for calibration through the communication with the image photographing device 20.

The communication processing unit 33 may transmit a photographing command through the communication with the color analyzing device 10 or the image photographing device 20.

The color calculating unit 35 may generate a conversion reference value (for example, a color conversion function) by using the input CIE XYZ value and RGB value. The color calculating unit 35 may generate the color conversion function by using a polynomial, a linear transform, a neural network, a lookup table, a multispectral transform method, and the like. The method of generating the color conversion function will be descried below with reference to FIG. 8.

The color calculating unit 35 may transfer the color conversion function to the inspection device 3 through the communication processing unit 33. The color conversion function may be used for determining defect of the display device 5 to be inspected by the inspection device 3. The inspection device 3 may include an inspection control unit 40 and an image photographing device 50. Herein, the image photographing device 50 may have the same type as that of the image photographing device 20 of the calibrating device 2, but is not limited thereto. The image photographing device 50 may photograph the image for inspection displayed in the display device 5 to be inspected and obtain an RGB value from the photographed image. In the exemplary embodiment, the RGB value obtained from the image for inspection may be defined as an RGB value for inspection.

The display device 5 to be inspected is the target for inspection of the defect, and may be the same type of display device as that of the display device 4 for calibration. In the exemplary embodiment, the display device 5 to be inspected may be a light emitting display device, such as an OLED, a QLED, and an AMOLED. The display device 5 to be inspected may be controlled by the inspection control unit 40 to output the image for inspection expressing a single color or various colors.

The inspection control unit 40 is the device for controlling an output of the image of the display device 5 to be inspected, and may include an inspection image output unit 41, a communication processing unit 43, and a color converting unit 45.

The inspection image output unit 41 may control the output of the display device 5 to be inspected by transmitting a signal related to the image for inspection to the display device 5 to be inspected. Herein, the image for inspection may be the same as the image for calibration, but is not limited thereto.

The communication processing unit 43 is the device for performing the communication with the image photographing device 50. The communication processing unit 43 may transmit a photographing command through the communication with the image photographing device 50. The communication processing unit 43 may receive the RGB value for inspection for the image for inspection through the communication with the image photographing device 50.

The color converting unit 45 may convert the input RGB value for inspection to a CIE XYZ value. The color converting unit 45 may convert the RGB value for inspection to the CIE XYZ value by using the color conversion function prepared by the color calculating unit 35. In the exemplary embodiment, the CIE XYZ value obtained by the color converting unit 45 may be defined as a CIE XYZ value for inspection.

The inspection control unit 40 may obtain the CIE XYZ value for the image for inspection through the color converting unit 45 even without using the color analyzing device 10 during the inspection of the defect of the display device 5 to be inspected.

The inspection control unit 40 may compare the prepared reference CIE XYZ value with the CIE XYZ value obtained by the color converting unit 45 and determine the defect of the display device 5 to be inspected. Herein, the reference CIE XYZ value may be the value corresponding to the signal output from the inspection image output unit 41 to the display device 5 to be inspected. The determination of the defect according to the result of the comparison by the inspection control unit 40 may allow a prescribed error.

Figure 2:
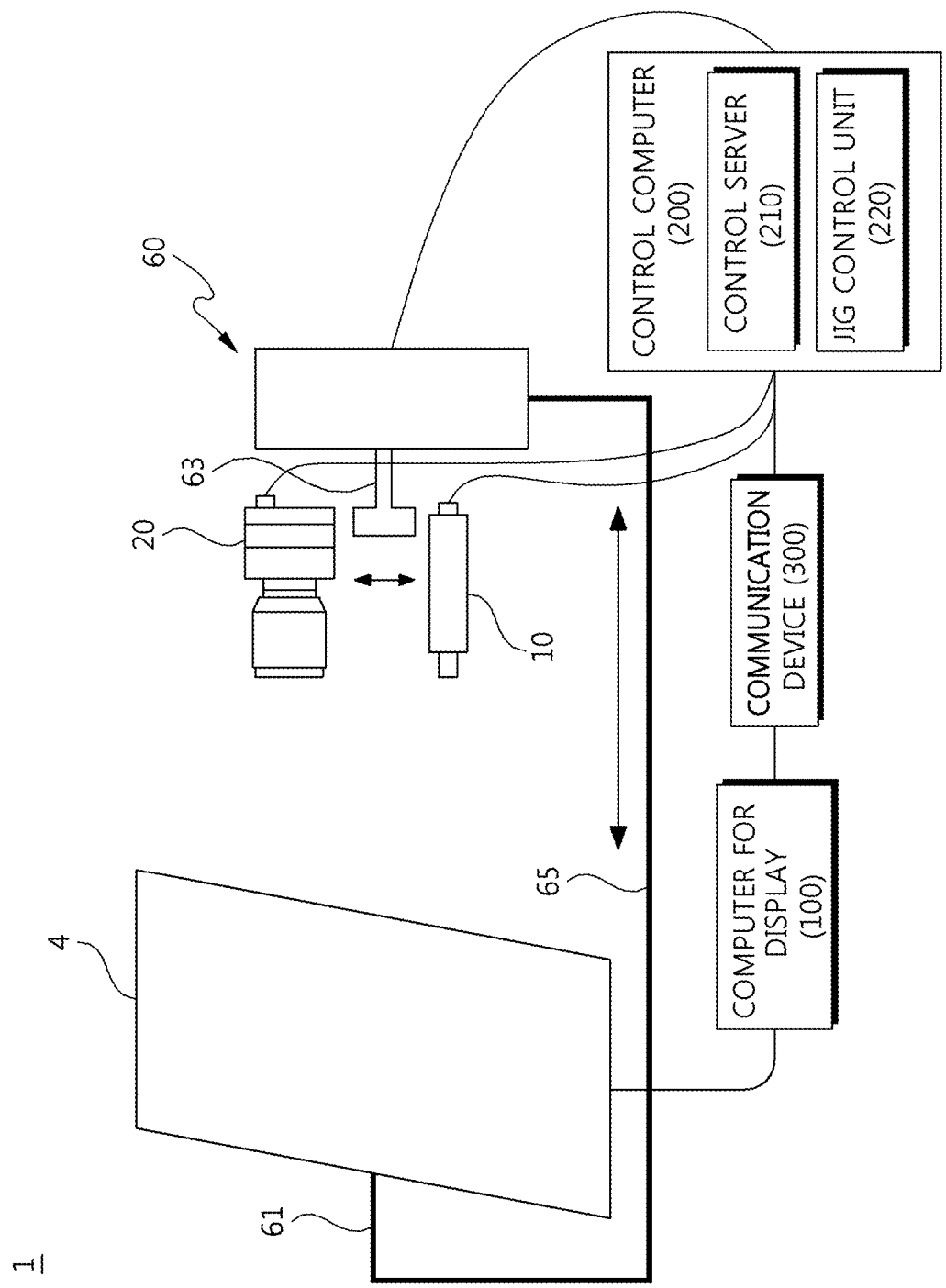
FIG. 2 is a schematic diagram illustrating a calibrating device of FIG. 1.

FIG. 2 is a schematic diagram illustrating the calibrating device of FIG. 1.

Referring to FIG. 2, the calibrating device 2 of the system 1 for analyzing the display device according to the exemplary embodiment of the present invention includes the configuration described with reference to FIG. 1, and may further include a jig device 60. Further, the function of the calibration control unit 30 may be distributed and applied to a computer 100 for display, a control computer 200, and a communication device 300. Hereinafter, detailed descriptions for the configurations described with reference to FIG. 1 will be omitted.

The jig device 60 may include a mounting unit 61 so that the display device 4 for calibration is mountable. The jig device 60 may be provided with a holding unit 63 so that the color analyzing device 10 and the image photographing device 20 may be held at locations facing the mounting unit 61. Herein, the color analyzing device 10 and the image photographing device 20 may be held side by side in left and right or up and down directions of the holding unit 63. The holding unit 63 may be formed to be rotatable based on a center axis so that a location conversion is possible between the color analyzing device 10 and the image photographing device 20.

The jig device 60 may be formed with a sliding structure 65 that allows the holding unit 63 to move back and forth, and left and right toward the mounting unit 61. The color analyzing device 10 and the image photographing device 20 may photograph all of the center portion and the outer portion of the display device 4 for calibration by the movement of the sliding structure 65.

In the computer 100 for display, a display program for controlling the output of the display device 4 for calibration may be installed. The computer 100 for display may generate an image for calibration. The computer 100 for display may control the display device 4 for calibration for outputting the image for calibration.

The control computer 200 may take a charge in overall control of the system 1 for analyzing the display device. The control computer 200 may include a control server 210 and a zig control unit 220.

The control server 210 may transmit an image display command to the computer 100 for display connected through the communication device 300. For example, the control server 210 may transmit an image display command in which each of the R, G, and B values sequentially displays [31, 63, 95, 127, 159, 191, 223, 225]. The computer 100 for display may generate an image for calibration in which approximately 512 colors are output by controlling the display value according to the image display command, and output the generated image for calibration through the display device 4 for calibration.

The control server 210 may transmit the photographing command to the color analyzing device 10 or the image photographing device 20. The control server 210 may receive the CIE XYZ value or the RGB value of the image photographed from the color analyzing device 10 or the image photographing device 20. The control server 210 may generate a color conversion function by using the CIE XYZ value or the RGB value when the display device 4 for calibration is photographed. In the zig control unit 220, a program for controlling the jig device 60 is installed. The zig control unit 220 may adjust a location of the holding unit 63 by applying a control signal to a motor (not illustrated) installed in the jig device 60. The zig control unit 220 may move the color analyzing device 10 and the image photographing device 20 held in the holding part 63 to appropriate locations by appropriately adjusting the location of the holding unit 63.

The communication device 300 may be a Local Area Network (LAN) communication device. The communication device 300 performs communication connection between the computer 100 for display and the control computer 200.

Figure 3:
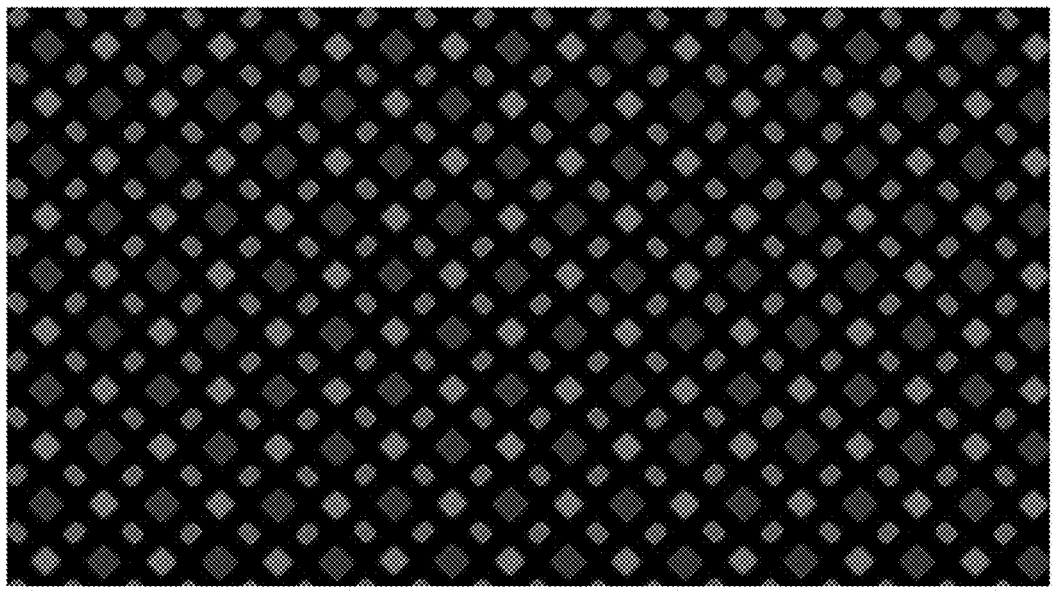
FIG. 3 is a diagram for describing a sub pixel of an OLED display device.

FIG. 3 is a diagram for describing a sub pixel of an OLED display device.

Referring to FIG. 3, sub pixels of an OLED display device can be checked. The pixel of the OLED display device may be formed of a combination of sub pixels. When the image for calibration output from the OLED display device is photographed, it is preferable to measure the color for each sub pixel.

Figure 4A:
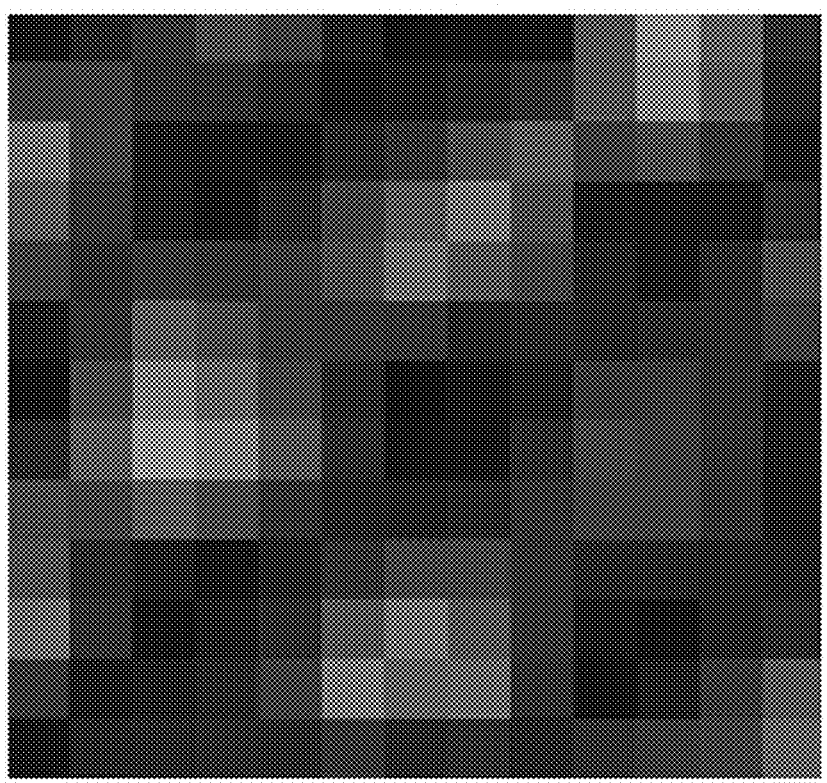
FIG. 4A is a diagram illustrating an example of an actually photographed image.
Figure 4B:
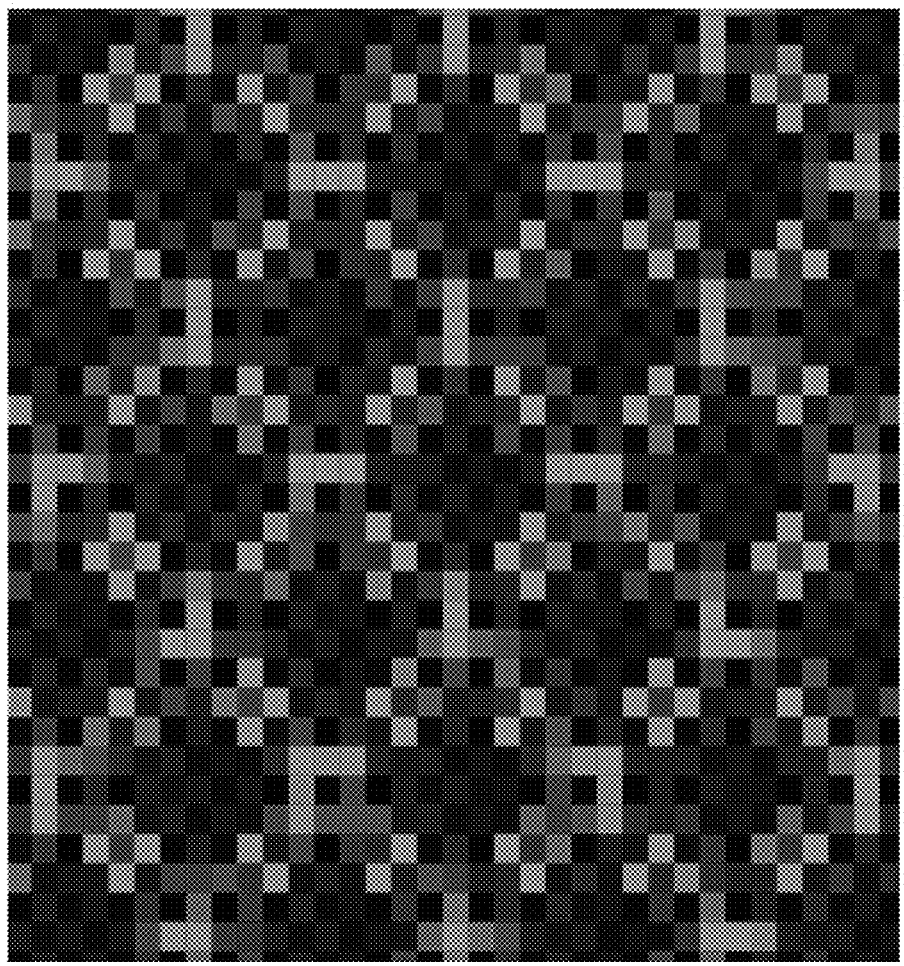
FIG. 4B is a diagram illustrating the case where an RGB value is applied to the actually photographed image according to a value of an RGB filter location.

FIG. 4A illustrates an example of an actually photographed image, and FIG. 4B is a diagram illustrating the case where an RGB value is applied to the actually photographed image according to a value of an RGB filter location.

In FIG. 4A, the intensity of each sub pixel is not uniform depending on the location, and the image appears darker toward the outside. In FIG. 4B, the image processed for visibility may be checked. The image may be obtained by applying a value of RGB to the actual image according to the value of the RGB filter location. The color analyzing device 10 is the spectrometer photographing a spot, so that the color analyzing device 10 cannot have a value for each sub pixel. Accordingly, the color analyzing device 10 needs to combine the values of the sub pixels and change the value to a value of a general pixel. To this end, two processes are required. The two processes include a process of appropriately interpolating a value of each pattern and restoring an unknown color value at each location, and a process of checking a sub pixel based on the obtained image and combining a value of each sub pixel.

Figure 5:
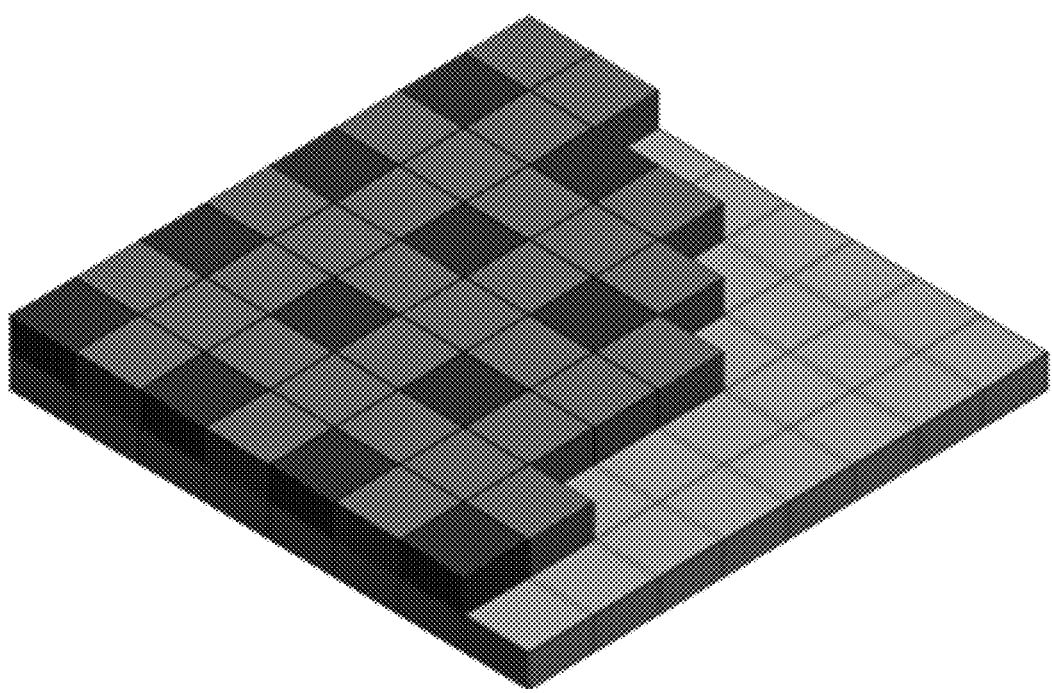
FIG. 5 is a diagram illustrating a Bayer pattern for describing whether a color restoration for each pixel is required.

FIG. 5 is a diagram illustrating a Bayer pattern for describing whether a color restoration for each pixel is required.

Referring to FIG. 5, in the Bayer pattern, R, G, and B filters are allocated to the pixels to detect colors. One pixel may detect only one color. Accordingly, in order to generate a generally recognizable image, the color needs to be restored through interpolation.

Figure 6:
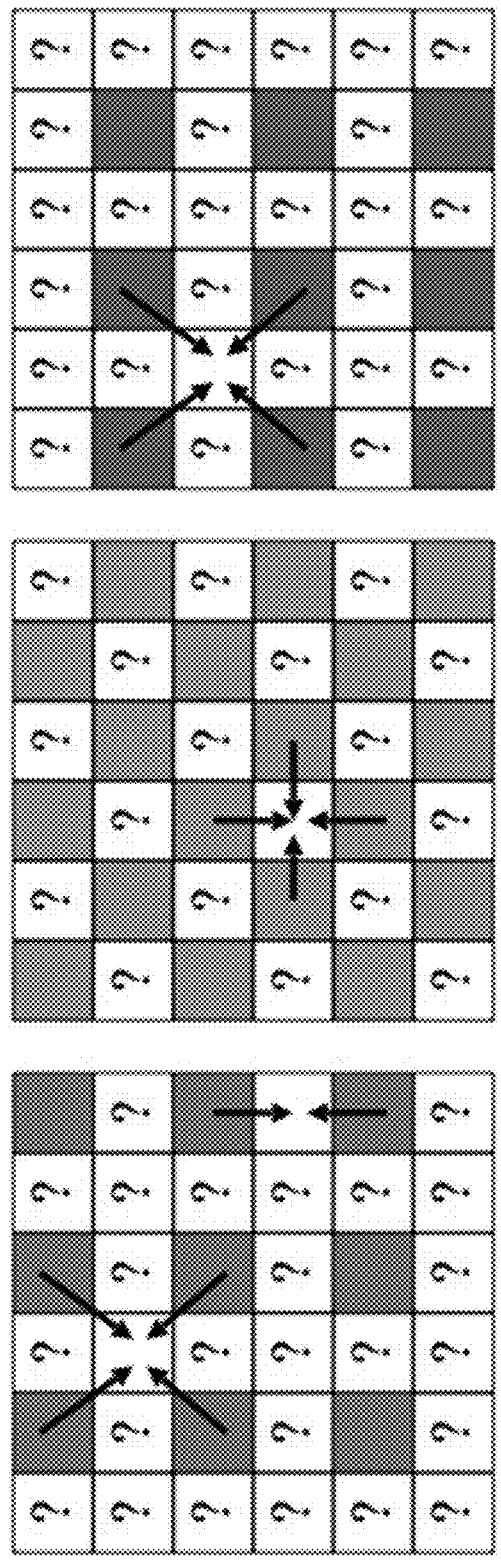
FIG. 6 is a diagram illustrating an example of a linear interpolation method.

FIG. 6 is a diagram illustrating an example of a linear interpolation method.

Referring to FIG. 6, among the interpolations, a linear interpolation method may be checked. The linear interpolation method is the method of filling the middle part between each pixel with an intermediate value of the surrounding values. In the case of the general image, the linear interpolation may operate without a problem. However, in the case of the image in which the color of one pixel is important, accuracy of the linear interpolation method may largely deteriorate. The inspection system of the present invention selectively applies the method of interpolating a difference between the pixels with modelling by replacing the existing linear interpolation method.

Figure 7A:
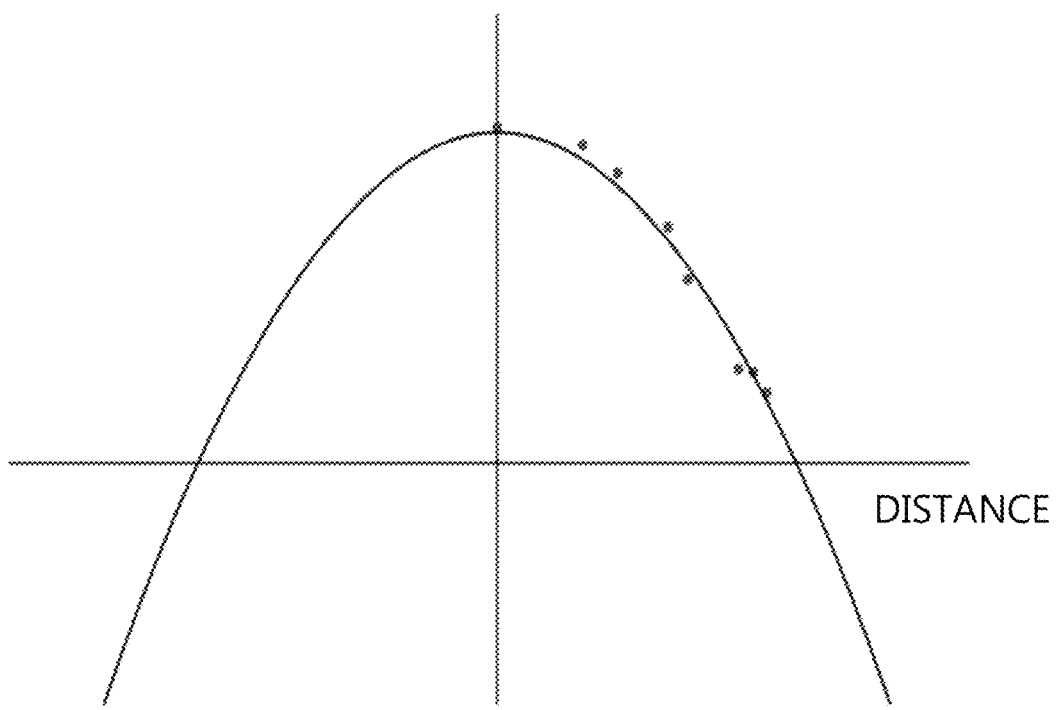
FIG. 7A is a diagram illustrating color distribution and estimation graph according to a distance for an image output from a display device.
Figure 7B:
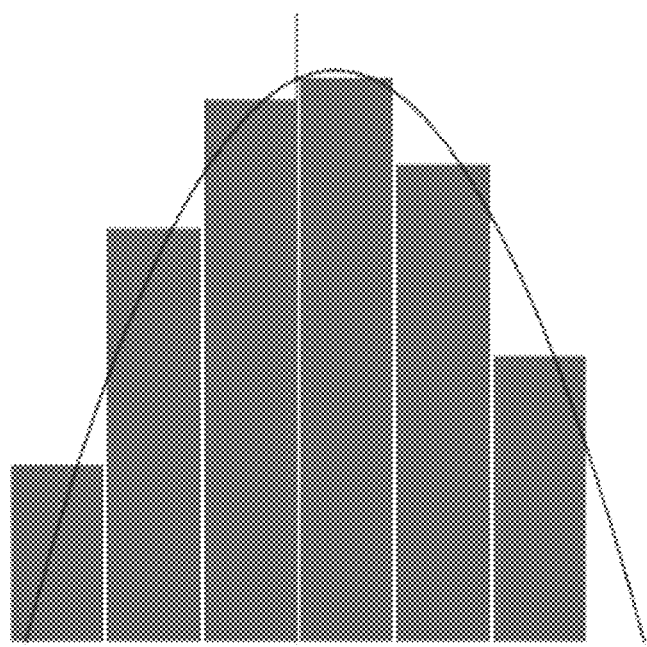
FIG. 7B is a diagram illustrating actual brightness (curve graph) of the display device and an input value (bar graph) received by a color analyzing device 10.

FIG. 7A illustrates color distribution and estimation graph according to a distance for an image output from the display device, and FIG. 7B is a diagram illustrating actual brightness (curve graph) of the display device and an input value (bar graph) received by the color analyzing device 10.

In FIG. 7A, after one sub pixel is photographed with a very large size, a change in brightness of the sub pixel may be modelled through distribution and distance of the corresponding color. When a predetermined value is applied to a model, a brightness curve of the display device corresponding to the curve graph illustrated in FIG. 7B may be estimated. This is more accurate compared to the case where a value of an actual sensor is used as it is.

In FIG. 7B, there is a difference between actual brightness and the value obtained by the sensor, and this is because a difference in a size between the pixel that is the minimum unit of the sensor and the display device is not large, so that all of the brightness changes according to the location of the display device cannot be detected.

The inspection system 1 of the present invention synthesizes each pixel information obtained as described above and generates a reference RGB value so that each color has one value. The reference RGB value may be different depending on each measurement location, so that in the present invention, the value around the center portion in which the most accurate value may be obtained is set as the reference RGB value. Further, there may be various methods for converting the measured value to one value, and the present invention applies a method of calculating a maximum value of each sub pixel and calculating an average of the maximum values.

Figure 8:
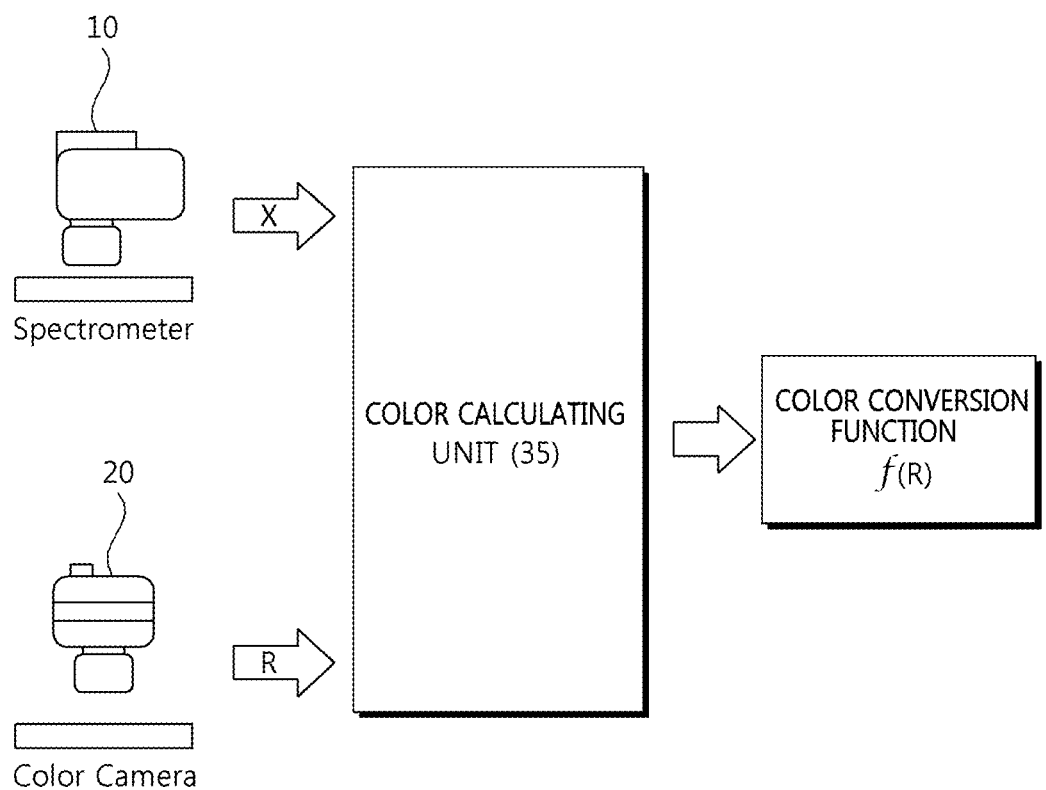
FIG. 8 is a diagram for describing a color conversion function generating method by using a color calculating unit.

FIG. 8 is a diagram for describing a color conversion function generating method by using a color calculating unit.

Referring to FIG. 8, when the color analyzing device 10 and the image photographing device 20 completely photograph the image for calibration of the display device 4 for calibration, the color calculating unit 35 may obtain 512 pairs of RGB, L1, L2, and L3 values. In the exemplary embodiment, L1, L2, and L3 values may be obtained with the CIE XYZ values. The color calculating unit 35 may generate a color conversion function (f(R)) by using the RGB value and the CIE XYZ value. In the exemplary embodiment, the color calculating unit 35 may generate the color conversion function (f(R)) by using a polynomial, a linear transform, a neural network, a lookup table, a multi-spectral transform method, and the like.

Figure 9:
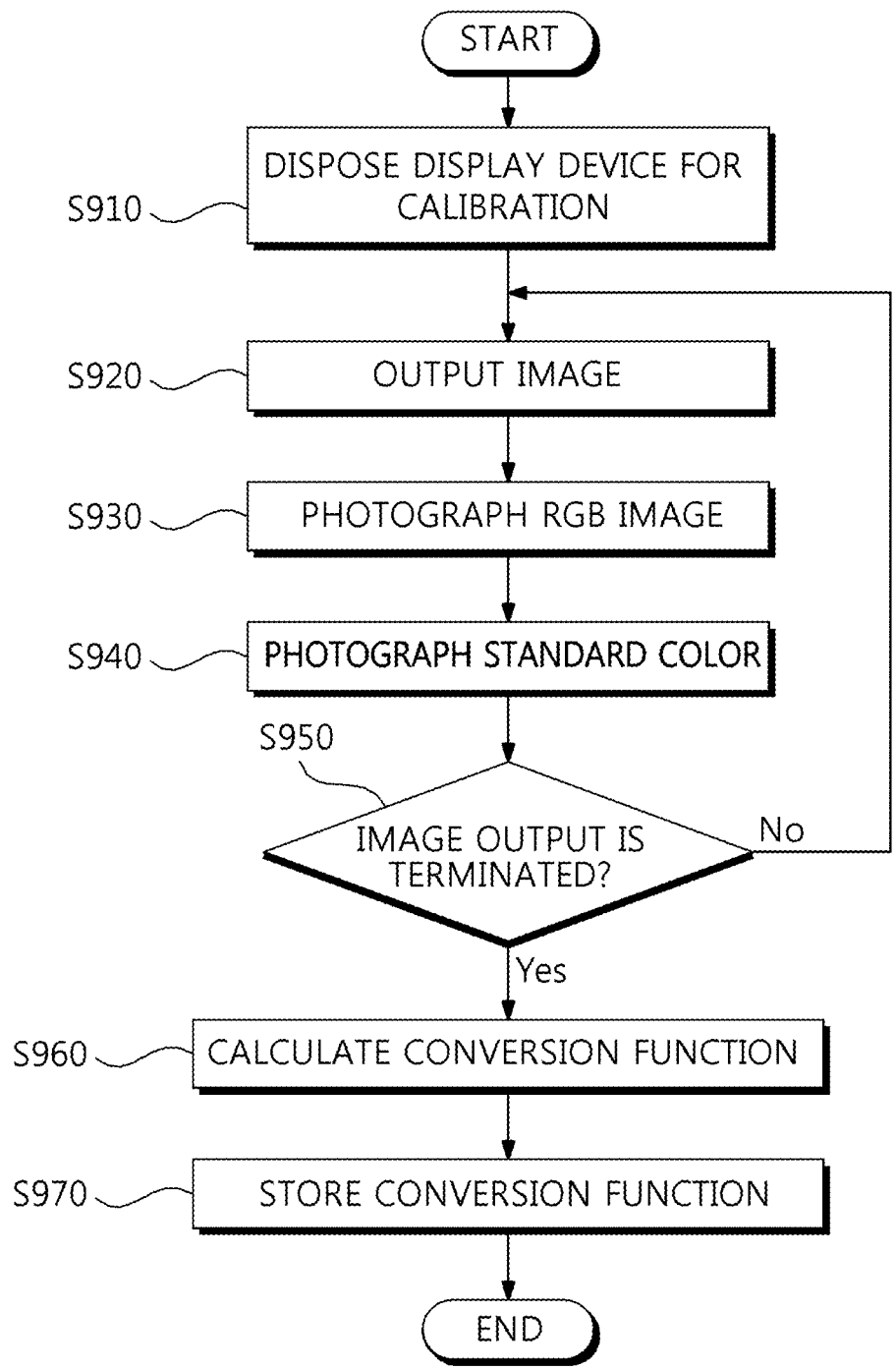
FIG. 9 is a first flowchart illustrating a color analysis method of the system for analyzing the display device according to an exemplary embodiment of the present invention.

FIG. 9 is a first flowchart illustrating a color analysis method of the system for analyzing the display device according to an exemplary embodiment of the present invention.

Referring to FIGS. 1 and 9, a color analysis method of the system for analyzing the display device according to an exemplary embodiment of the present invention includes a disposing operation S910, an image for calibration outputting operation S920, an RGB image for calibration photographing operation S930, a standard color photographing operation S940, an image for calibration output terminating operation S950, a color conversion function calculating operation S960, and a color conversion function storing operation S970.

In the disposing operation 910, the display device 4 for calibration is disposed. Herein, the display device 4 for calibration may be disposed in a dark room in order to minimize interference of other light.

In the image for calibration outputting operation S920, the calibration control unit 30 outputs an image for calibration by controlling the display device 4 for calibration after the display device 4 for calibration is installed at a designated location. The image for calibration may consist of colors according to a previously prepared color list. In the exemplary embodiment, the color list may include $A^{th}$ to $Z^{th}$ colors. The $A^{th}$ color may be red and the $Z^{th}$ color may be blue, but are not limited thereto. A color between the $A^{th}$ color and the $Z^{th}$ color may be appropriately set. The image for calibration including the color between the $C^{th}$ color and the $I^{th}$ color among the $A^{th}$ to $Z^{th}$ colors in the color list may be output, but is not limited thereto.

In the RGB image for calibration photographing operation S930, the image photographing device 20 photographs the image for calibration and obtains an RGB value for calibration from the photographed image. In this case, a location of the image photographing device 20 is controlled by the jig device 60, so that the image photographing device 20 may photograph the center portion and the outer portion of the display device 4 for calibration.

In the standard color photographing operation S940, the color analyzing device 10 photographs the image for calibration and obtains a CIE XYZ value for calibration from the photographed image. In this case, the color analyzing device 10 may obtain the CIE XYZ value for calibration by obtaining L1, L2, and L3 values related to light wavelengths in the spectrum of the photographed image and converting the obtained L1, L2, and L3 values.

The RGB image for calibration photographing operation S930 and the standard color photographing operation S940 are not limited to the sequential performance order, but may be performed in the same order or may also be performed in an opposite order.

In the image for calibration output terminating operation S950, when the image photographing device 20 and the color analyzing device 10 complete the photographing, the calibration control unit 30 terminates the output of the image for calibration by controlling the display device 4 for calibration.

In the color conversion function calculating operation S960, when the image output of the display device 4 for calibration is terminated, the calibration control unit 30 generates a color conversion function by using the RGB Value for calibration and the CIE XYZ value for calibration. Herein, the calibration control unit 30 may generate the color conversion function by using a polynomial, a linear transform, a neural network, a lookup table, a multispectral transform method, and the like.

In the color conversion function storing operation S970, the calibration control unit 30 stores the generated color conversion function in a storage device. The stored color conversion function may be used for performing a defect inspection of the display device 5 to be inspected. The performance of the defect inspection of the display device 5 to be inspected may be checked through FIG. 10 below.

Figure 10:
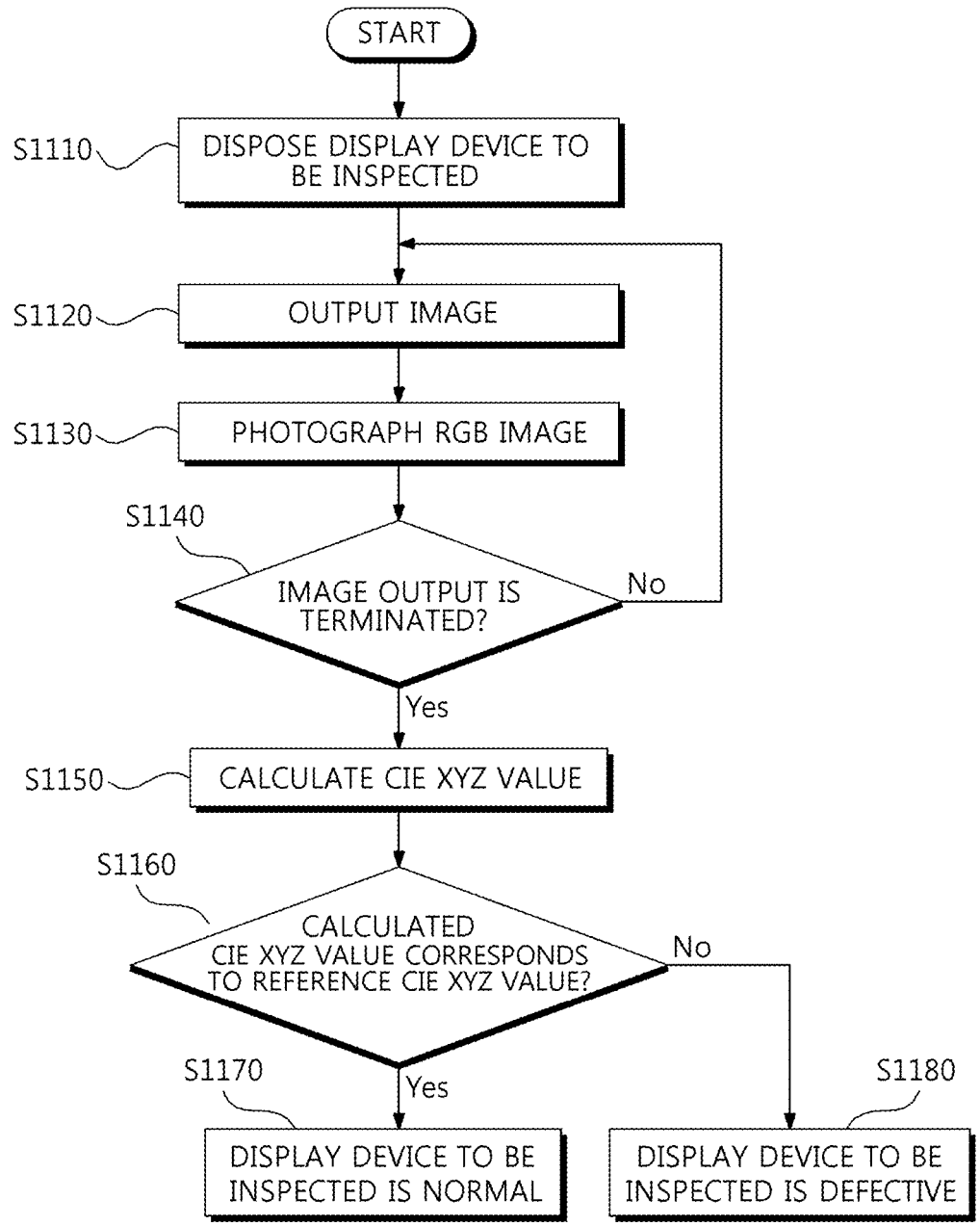
FIG. 10 is a second flowchart illustrating a color analysis method of the system for analyzing the display device according to an exemplary embodiment of the present invention.

FIG. 10 is a second flowchart illustrating a color analysis method of the system for analyzing the display device according to an exemplary embodiment of the present invention.

Referring to FIGS. 1 and 10, a color analysis method of the system for analyzing the display device according to an exemplary embodiment of the present invention may further include a disposing operation S1110, an image for inspection outputting operation S1120, an RGB image for inspection photographing operation S1130, an image for inspection output terminating operation S1140, a CIE XYZ value for inspection calculating operation S1150, a defect inspecting operation S1160, a normality determining operation S1170, and a defect determining operation S1180.

In the disposing operation S1110, the display device 5 to be inspected is disposed. Herein, the display device 5 to be inspected may be disposed in a dark room in order to minimize interference of other light.

In the image for inspection outputting operation S1120, after the display device 5 to be inspected is installed at a designated location, the inspection control unit 40 outputs the image for inspection by controlling the display device 5 to be inspected. The image for inspection may consist of colors included in a previously prepared color list. In the exemplary embodiment, the image for inspection including the color between the $C^{th}$ color and the $I^{th}$ color among the $A^{th}$ to $Z^{th}$ colors in the color list may be output, but is not limited thereto.

In the RGB image for inspection photographing operation S1130, the image photographing device 50 photographs an image for inspection and obtains an RGB value from the photographed image. In this case, the image photographing device 50 may photograph only the center portion of the display device 5 to be inspected, unlike the display device 4 for calibration.

In the image for inspection output terminating operation S1140, when the photographing of the image photographing device 50 is terminated, the inspection control unit 40 terminates the output of the image for inspection by controlling the display device 5 to be inspected.

In the CIE XYZ value for inspection calculating operation S1150, when the image output of the display device 5 to be inspected is terminated, the inspection control unit 40 calculates a CIE XYZ value for inspection by using a previously prepared color conversion function and an RGB value for inspection. Herein, the RGB value for inspection may be the value corrected through a lens distortion correction. In the meantime, the inspection control unit 40 may also convert the calculated CIE XYZ value for inspection into light wavelengths L1, L2, and L3.

In the defect inspecting operation S1160, the inspection control unit 40 compares the CIE XYZ value for inspection with a reference CIE XYZ value and determines whether the CIE XYZ value for inspection corresponds to the reference CIE XYZ value. The inspection control unit 40 may also perform a color flatness check, and the like by using the CIE XYZ value for inspection.

In the normality determining operation S1170, when the CIE XYZ value for inspection corresponds to the reference CIE XYZ value, the inspection control unit 40 may determine that the display device 5 to be inspected is normal.

In the defect determining operation S1180, when the CIE XYZ value for inspection does not correspond to the reference CIE XYZ value, the inspection control unit 40 may determine that the display device 5 to be inspected has defect.

Although the exemplary embodiment of the present invention has been described for illustrative purposes, those skilled in the art will appreciate that various modifications, additions and substitutions are possible, without departing from the essential characteristic of the invention. Therefore, the embodiments disclosed in the present invention and the accompanying drawings are not intended to limit the technical spirit of the present invention, but are intended to illustrate the scope of the technical idea of the present invention, and the technical scope of the present invention is not limited by the embodiment and the accompanying drawings.

The steps and/or operations according to the present invention may occur in different orders, or in parallel, or simultaneously in different exemplary embodiments for different epochs and the like as may be appreciated by those skilled in the art.

Depending on the exemplary embodiment, a part or the entirety of the steps and/or operations may be implemented or performed by using commands stored in one or more non-temporary computer-readable media, a program, an interactive data structure, and one or more processors driving a client and/or a server. One or more non-temporary computer-readable media are, for example, software, firmware, hardware, and/or any combination thereof. Further, the function of "module" discussed in the present specification may be implemented by software, firmware, hardware, and/or any combination thereof.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A system for analyzing a display device, the system comprising:
    an image photographing camera device configured to photograph an image for inspection output from a display device to be inspected and obtain an RGB value for inspection from the photographed image;
    an inspection control unit configured to convert the RGB value for inspection into a CIE XYZ value for inspection by using a previously prepared color conversion function, and determine a defect of the display device to be inspected by using the converted CIE XYZ value for inspection; and
    a color analyzing device configured to photograph an image for calibration output from a display device for calibration and measure a spectrum of the photographed image;
    wherein
        the color analyzing device obtains a light wavelength from the spectrum and converts the obtained light wavelength into a CIE XYZ value for calibration, and
        the image photographing camera device photographs the image for calibration output from the display device for calibration and obtains an RGB value for calibration from the photographed image;
    the system further comprising a calibration control unit configured to calculate a color conversion function by using the RGB value for calibration and the CIE XYZ value for calibration obtained by the color analyzing device,
    wherein the calibration control unit generates the color conversion function by using at least one of a polynomial, a linear transform, a neural network, a lookup table, or a multispectral transform method;
    wherein the color analyzing device is composed of any one of a spectrometer, a tristimulus colorimeter, and a RGB colorimeter; and
    wherein the inspection control unit and the calibration control unit are implemented by a processor.

2. The system of claim 1, wherein the display device to be inspected is a light emitting display device.

3. The system of claim 1, wherein the inspection control unit compares the CIE XYZ value for inspection with a reference CIE XYZ value and determines the defect of the display device to be inspected according to correspondence between the CIE XYZ value for inspection and the reference CIE XYZ value.

4. The system of claim 1, wherein the inspection control unit includes:
    an inspection image output unit which controls an output of the display device to be inspected;
    a communication processing unit which performs communication with the image photographing camera device and receives the RGB value for inspection; and
    a color converting unit which converts the RGB value for inspection into the CIE XYZ value for inspection by using the color conversion function.

5. The system of claim 1, wherein the display device for calibration is a light emitting display device that is a same type as a type of the display device to be inspected.

6. The system of claim 1, wherein the calibration control unit includes:
    a calibration image output unit which controls an output of the display device for calibration;
    a communication processing unit which performs communication with the color analyzing device or the image photographing camera device and receives the CIE XYZ value for calibration and the RGB value for calibration; and
    a color calculating unit which generates the color conversion function by using the CIE XYZ value for calibration and the RGB value for calibration.

7. The system of claim 1, further comprising: a jig device including a mounting unit to which the display device for calibration is mounted, and a holding unit which is provided at a location facing the mounting unit and in which the color analyzing device and the image photographing camera device are held.

8. The system of claim 7, wherein the jig device is configured to connect the mounting unit and the holding unit, and has a sliding structure that allows back and forth and left and right sliding operations.

9. The system of claim 8, wherein:
    the calibration control unit is configured to photograph a center portion and an outer portion of the display device for calibration by adjusting a location of the image photographing camera device by controlling the sliding structure.

10. A method of analyzing a color of a system for analyzing a display device, the method comprising:
    an RGB image for calibration photographing operation for photographing an image for calibration and obtaining an RGB value for calibration from the photographed image;
    a standard color photographing operation for photographing the image for calibration and obtaining a CIE XYZ value for calibration from the photographed image; and
    a color conversion function calculating operation for calculating a color conversion function by using the RGB value for calibration and the CIE XYZ value for calibration;
    an RGB image for inspection photographing operation for photographing an image for inspection and obtaining an RGB value for inspection from the photographed image; and
    a defect inspecting operation for determining a defect of the image for inspection by using the color conversion function and the RGB value for inspection;
    wherein the color conversion function calculating operation generates the color conversion function by using at least one of a polynomial, a linear transform, a neural network, a lookup table, or a multispectral transform method.

11. The method of claim 10, further comprising:
a color conversion function storing operation for storing the color conversion function.

12. The method of claim 10, further comprising:
a CIE XYZ value for inspection calculating operation for calculating a CIE XYZ value for inspection by using the color conversion function and the RGB value for inspection.

13. The method of claim 12, wherein the defect inspecting operation including comparing the CIE XYZ value for inspection with a reference CIE XYZ value and determining a defect of the image for inspection according to correspondence between the CIE XYZ value for inspection and the reference CIE XYZ value.

14. The method of claim 10, wherein in the RGB image for calibration photographing operation and the standard color photographing operation, a center portion and an outer portion of the image for calibration are photographed by using a jig device.

15. The method of claim 10, wherein the image for calibration and the image for inspection are output from a light emitting display device.

\* \* \* \* \*